United States Patent
Wittren

[11] Patent Number: 4,463,775
[45] Date of Patent: Aug. 7, 1984

[54] COMPENSATING VALVE

[75] Inventor: Richard A. Wittren, Cedar Falls, Iowa

[73] Assignee: Deere & Company, Moline, Ill.

[21] Appl. No.: 577,723

[22] Filed: Feb. 6, 1984

Related U.S. Application Data

[63] Continuation of Ser. No. 477,992, Mar. 23, 1983.

[51] Int. Cl.$^3$ .......................................... G05D 11/00
[52] U.S. Cl. ..................................... 137/111; 91/517; 91/518
[58] Field of Search .................. 137/111, 112; 91/517, 91/518, 466

[56] References Cited

U.S. PATENT DOCUMENTS 2,774,369 12/1956 Ditirro ............................... 137/111
3,550,611 12/1970 Baatrup .............................. 137/111

Primary Examiner—Martin P. Schwadron
Assistant Examiner—James R. Shay

[57] ABSTRACT

A hydrostatic power steering control system with variable feedback compensation employing a unique compensating valve. The steering control system includes first and second hydraulic cylinders, each having two internal chambers denoted as head and feedback chambers. A piston is movably retained in each of the cylinders and is attached to a piston rod which extends outwards. The pair of piston rods are connected to a pair of steerable wheels by a mechanical linkage. Fluid contained in a reservoir is pressurized by a supply pump and is selectively passed to a head chamber of one of the cylinders by a control valve. The control valve is actuated by pressure differences in two interconnected fluid passages which connect to the feedback chambers of the two cylinders. A pressure difference in these passages is created by manually operating a steering wheel which actuates a metering pump positioned across the fluid passages. In order to alleviate pressure fluctuations between the two feedback chambers, a compensating valve and a pair of one-way check valves are connected across the fluid passages in a parallel relationship. The compensating valve allows pressurized fluid above a predetermined pressure range value to be relieved from the system, but does not limit a pressure value generated by the metering pump.

8 Claims, 4 Drawing Figures

COMPENSATING VALVE

This application is a continuation of application Ser. No. 477,992, filed Mar. 23, 1983.

BACKGROUND OF THE INVENTION

1. Field of the Invention

This invention relates to a steering system which uses a unique compensating valve and more particularly, to a hydrostatic power steering control system with variable volume feedback compensation.

2. Description of the Prior Art

The use of hydraulic steering cylinders to control the position of the steerable wheels on a vehicle, especially off-road type vehicles, is commonplace. Normally, a mechanical linkage is employed which connects the two steering arms together in such a manner as to cause the outside wheel to generate a greater turning radius than the inside wheel. Since it is also common practice to connect the steering cylinders to extensions of the steering arms, the cylinders experience differences in piston velocities during a steering cycle. These variations in piston velocities cause fluctuations of the fluid flow rates that are detrimental to the control of the vehicle if they are not corrected.

Several solutions to correct for the differences in piston velocities have been proposed. One such solution is the use of an equal area displacement cylinder as taught by L. Blatt et al in U.S. Pat. No. 3,949,650 issued Apr. 13, 1976, in the steering system. Another solution proposed by applicant is the use of two interconnected equal area displacement cylinders with constant volume feedback. Both of these systems are satisfactory but do not allow for a steering control system wherein hydraulic cylinders having only two internal chambers are used. The use of cylinders having two such chambers reduces the need for closer piston rod tolerances, lessen manufacturing time and lower the cost of the cylinders. Now a steering control system with variable volume feedback compensation has been invented which uses hydraulic cylinders having only two internal chambers.

SUMMARY OF THE INVENTION

Briefly, this invention relates to a hydrostatic power steering control system with variable volume feedback compensation. The steering control system includes first and second hydraulic cylinders having a housing which contains a piston and an attached piston rod which extends through one end of the housing. One end of the cylinders is connected to a pair of steerable wheels and also to each other by a mechanical link which causes the piston rods in the cylinders to move simultaneously. Within each of the housings are two chambers denoted as a head chamber and a feedback chamber. The head chamber is the area formed by the head of the piston and the internal surface of the cylinder housing and the feedback chamber is the area within the cylinder housing which contains the piston rod. Both chambers contain fluid ports which communicate with fluid passages. A first pair of fluid passages are respectively connected to the head chambers of the cylinders and a second pair of fluid passages are respectively connected to the feedback chambers of the first and second cylinders. A pressurized fluid source is selectively connectible to the first pair of passages by way of a pressure-operated control valve to which the first pair of fluid passages are connected. The control valve is connected between the second pair of fluid passages and its movement is caused by pressure differences in the passages. A pressure difference is created by turning a manually operable steering wheel which actuates a metering pump that interconnects the second pair of fluid passages which connect with the two feedback chambers. In addition, a compensating valve and a pair of check valves are fluidly connected in parallel with each other across the second pair of fluid passages.

As the steering wheel is turned in a first direction, the metering pump causes a pressure increase in one of the pair of fluid passages connected to the feedback chambers. This pressure increase acts on one end of the control valve to cause the control valve to shift to a position which allows pressurized fluid to pass from the fluid source to the head chamber of one of the cylinders. Simultaneously, the control valve connects the head chamber of the other cylinder to the reservoir. The incoming pressurized fluid into the one head chamber causes the piston rod to extend and this movement is relayed by the mechanical link to the piston rod in the other cylinder which will retract. Such movement of the two piston rods allows the wheels to turn in a similar direction. As the piston rod of the one cylinder extends, fluid is forced out of the feedback chamber thereof at a rate or velocity which differs from the rate or velocity that fluid may enter the feedback chamber of the cylinder with the retracting piston rod. Therefore, the compensating valve is connected across the second pair of fluid passages, and compensates for fluid fluctuations caused by the differences in piston rod stroke during a steering cycle. The compensating valve functions to dump excess fluid to the reservoir in response to excessive pressures in the pair of passages connected to the feedback chambers.

The general object of this invention is to provide a hydrostatic power steering control system having variable volume feedback compensation. A more specific object of this invention is to provide a hydrostatic power steering control system using a compensating valve which will allow fluid to be discharged from the system once a predetermined pressure range value has been exceeded.

Another object of this invention is to provide a hydrostatic power steering control system with variable volume feedback compensation to correct variable volume feedback caused by differences in piston stroke in a pair of hydraulic cylinders.

Still another object of this invention is to provide a hydrostatic power steering control system using a compensating valve which is suitable for use with hydraulic cylinders having only two internal chambers.

A further object of this invention is to provide a compensating valve having a unique shuttle pin and check ball arrangement wherein fluid flow can be both regulated and restricted.

Other objects and advantages of the present invention will become more apparent to those skilled in the art in view of the following description and the accompanying drawings.

DETAILED DESCRIPTION OF THE PREFERRED EMBODIMENT

Figure 1:
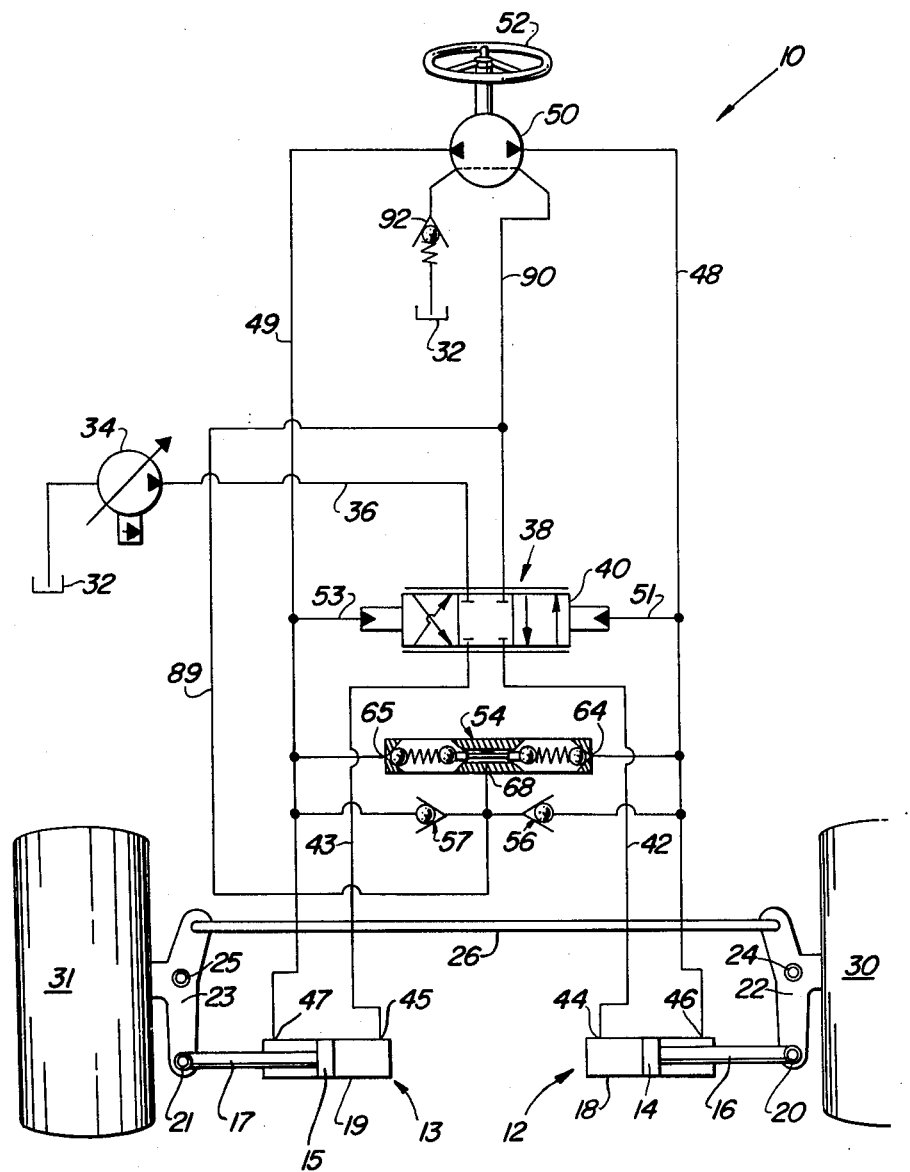
FIG. 1 is a schematic view of a steering control system with variable volume feedback compensation.

Referring now to FIG. 1, a hydrostatic power steering control system 10 with variable volume feedback compensation is shown. The steering control system 10 includes first and second hydraulic cylinders, 12 and 13 respectively. The cylinders 12 and 13 respectively, include pistons 14 and 15 to which are respectively attached piston rods 16 and 17 which are in turn reciprocably mounted in housings 18 and 19, respectively. Outward ends 20 and 21, respectively, of the piston rods 16 and 17 are respectively connected to respective first ends of support arms 22 and 23 which respectively pivot about points 24 and 25. The support arms 22 and 23 are attached together by a link 26, preferably a mechanical link, which has its opposite ends respectively connected to the support arms 22 and 23 at respective locations at the opposite sides of the pivot points 24 and 25 from the connection points of the pistons rod ends 20 and 21 with the support arms 22 and 23. The support arms 22 and 23, together with the link 26, form what is conventionally known as an Ackerman linkage.

The Ackerman linkage supports a pair of steerable wheels 30 and 31 which are attached to the support arms 22 and 23, respectively, in a commonly known manner.

Each of the hydraulic cylinders 12 and 13, respectively, contain two internal chambers denoted as head and feedback chambers. Each head chamber is located between a first end of a respective one of the cylinders and the associated piston while each feedback chamber is located between a second end of the cylinders and the associated piston. As is common terminology in the hydraulic industry, the head chamber is the area which does not contain a piston rod while the feedback chamber is the area which does. The volume of both the head and feedback chambers will vary as the respective piston and piston rod reciprocate within the cylinder housings 18 and 19.

Fluid to actuate the hydraulic cylinders 12 and 13 is contained in a reservoir 32. A supply pump 34, which is connected to the reservoir 32, supplies pressurized fluid through a passage 36 to a control valve 38. The control valve 38, which is preferably a four-way, three-position directional control valve, has a movable member 40 which is shiftable from a normally neutral position to a first position or a second position. As the movable member 40 is shifted within the control valve 38, passage of pressurized fluid from the supply pump 34 is selectively controlled to one of the head chambers of the cylinders 12 or 13 through respective fluid passages 42 and 43 and respective fluid ports 44 and 45. Additional fluid ports 46 and 47 communicate with the respective feedback chambers of the cylinders 12 and 13 and with fluid passages 48 and 49. The fluid passages 48 and 49 and connected together by a metering pump 50, which is actuatable by a manually operable steering element 52 such as a steering wheel. Preferably, the metering pump 50 is a bi-directional pump.

The control valve 38 is fluidly connected to the fluid passages 48 and 49 by fluid lines 51 and 53 and has pressure actuatable means which shift the movable member 40 within the control valve 38. As a predetermined pressure range difference in the fluid passages 48 and 49 is exceeded, the movable member 40 will be repositioned so as to control the flow of fluid through the control valve 38.

Figure 2:
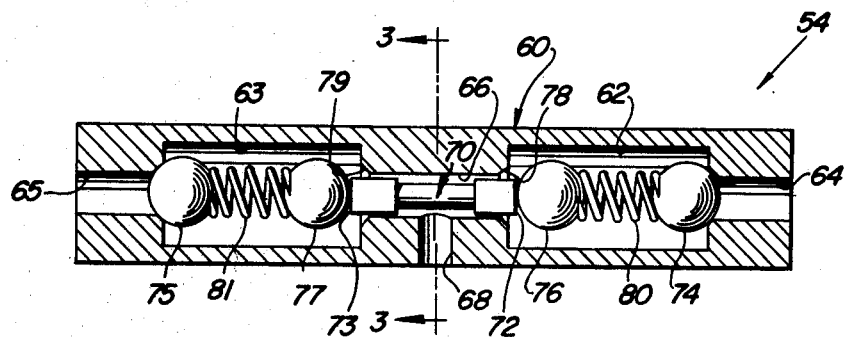
FIG. 2 is a cross-sectional view of a compensating valve used to regulate pressure differences across two fluid passages.
Figure 3:
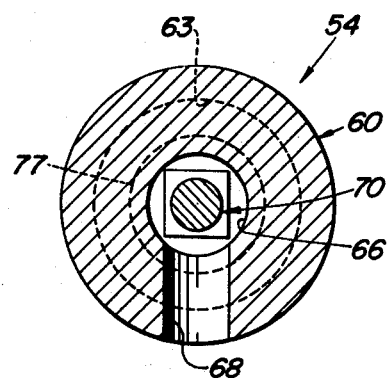
FIG. 3 is a sectional view of FIG. 2 along line 3—3.
Figure 4:
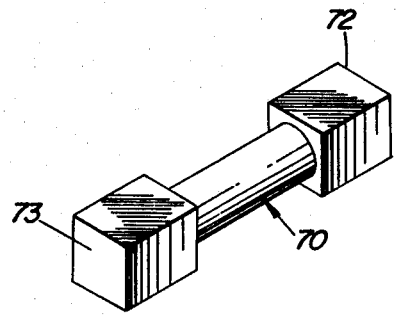
FIG. 4 is a perspective view of the shuttle pin shown in FIG. 2.

Connected between the fluid passages 48 and 49, in parallel with the control valve 38, and a compensating valve 54 and a pair of one-way check valves 56 and 57. The compensating valve 54, better seen in FIGS. 2-4, includes a housing 60 defining a pair of axially aligned bores 62 and 63. The bores 62 and 63 respectively have inlet ports 64 and 65 and are connected together by a through passage 66 which communicates with an outlet port 68. Movably positioned in the through passage 66 is a shuttle pin 70 having first and second ends 72 and 73 which respectively extend into the bores 62 and 63 when the shuttle pin 70 is in a normal neutral position, as shown in FIG. 2. The shuttle pin 70 is designed to allow fluid to flow from the bores 62 and 63 into the through passage 66. Therefore, the shuttle pin 70 should either have a smaller diameter than the interior diameter of the through passage 66 or be constructed with a different cross-sectional shape. Preferably, the shuttle pin 70 can be constructed to satisfy both criteria, as is shown in FIGS. 2-4. Although the configuration of the shuttle pin 70 can vary, preferably the first and second ends 72 and 73 are flat to allow free seating of contactable check elements.

Positioned in the bore 62 are first and second check elements 74 and 76, respectively, and positioned in the bore 63 are first and second check elements 75 and 77, respectively. The first check elements 74 and 75 are movably positioned adjacent inner ends of the inlet ports 64 and 65 while the second check elements 76 and 77 respectively, are movably positioned adjacent valve seats 78 and 79 formed at the opposite ends of the passage 66 which respectively open into the bores 62 and 63.

Positioned between the check elements 74 and 76, which are preferably check balls, is a biasing means 80, such as a compression spring. Likewise, positioned between the check elements 75 and 77, which are preferably check balls, is a biasing means 81, such as a compression spring. The compression springs 80 and 81 should have approximately the same compressive strength so that the outer two check balls 74 and 75 open at an equal pressure valve. The inner two check balls 76 and 77 continually contact the first and second ends 72 and 73, respectively, of the shuttle pin 70 and are normally spaced from the respective valve seats 78 and 79. In the normal neutral position, see FIG. 2, the outer check balls 74 and 75 close off and block fluid flow through the inlet ports 64 and 65 while the inner check balls 76 and 77 are spaced from the valve seats 78 and 79.

Referring again to FIG. 1, the outlet port 68 of the compensating valve 54 is connected to a fluid passage 89. The fluid passage 89 is in turn connected to a return line 90 which is positioned between the control valve 38 and the reservoir 32. Located in the return line 90 is a pressure relief valve 92 which maintains a positive pressure in the return line 90. This pressure relief valve 92 is set to open at a higher pressure than that needed to open the check valves 56 and 57 to insure that adequate fluid is always present in the fluid passages 48 and 49. The check valves 56 and 57, which are conventional check ball type valves, allow fluid flow only in one direction. When the pressure in either one of the passages 48 or 49 goes below a minimum predetermined value, the respective check valves 56 or 57 will open and permit fluid in the fluid passage 89 and the return line 90 to be routed into the respective fluid passage 48 or 49. This feature prevents air from being drawn into the fluid passages 48 and 49, which could adversely affect the steering operation.

The return line 90 can be constructed to pass through the metering pump 50 so that the heat generated by the flowing fluid in the return line 90 can be transferred to the metering pump 50. This is beneficial when the steering system 10 is mounted on a vehicle which is operated in cold weather for a warm metering pump 50 will facilitate the movement of fluid therethrough as well as heating up this bypassing fluid.

Operation

The operation of the steering system 10 will now be explained. Starting from a position wherein the wheels 30 and 31 are aligned straight ahead and with the engine of the vehicle running, pressurized fluid from the supply pump 34 will be present in the fluid passage 36. This pressurized fluid is blocked from passing to one of the head chambers of the cylinders 12 or 13 by the control valve 38 which is in a neutral position. It should be noted that during a turn, the inside wheel will have to turn through a greater arc than the outside wheel. Therefore, the stroke of the piston rods 16 and 17 in the respective cylinders 12 and 13 will be different. This difference in piston rod stroke will cause fluid fluctuations within the system 10 which will have to be compensated for in order to prevent failure of the system components, such as breakage of the hydraulic hoses.

As the steering wheel 52 is turned, the metering pump 50 will be actuated to facilitate fluid movement between the fluid passages 48 and 49. This fluid movement creates a pressure difference between the fluid passages 48 and 49 which in turn causes the movable member 40 of the control valve 38 to shift from its neutral position to either its first position which is completely to the right or its second position which is completely to the left. For example, as the operator turns the steering wheel 52 counterclockwise for a left-hand turn, as viewed in FIG. 1, the metering pump 50 will transfer fluid from the passage 48 into the passage 49. This action will increase the fluid pressure in the passage 49 over that in the passage 48. This pressure difference will be felt in the passages 51 and 53 and because the higher pressure is present in the passage 53, the movable member 40 of the control valve 38 will be shifted to the right.

With the control valve 38 in its first position, the pressurized fluid from the supply pump 34 is able to pass through the control valve 38 and the passage 42 to the port 44 which communicates with the head chamber of the first cylinder 12. Simultaneously, the head chamber of the second cylinder 13 is fluidly connected to the reservoir 32 by the port 45, the passage 43, the control valve 38 and the return line 90.

The pressurized fluid entering the head chamber of the first cylinder 12 will cause the piston rod 16 to extend. This extension of the piston rod 16 causes the support arm 22 to pivot about the point 24 thereby turning the wheel 30 to the left. At the same time as the inside wheel 30 is turning, the mechanical link 26 is forced to the left by the support arm 22 and causes the support arm 23 to pivot about the point 25. As the support arm 23 pivots, the piston rod 17 is retracted and the outer wheel 31 is turned leftward.

As was mentioned above, the inner wheel during a turn will turn through a greater arc than the outer wheel. In our lefthand turn example, the inner wheel is wheel 30. This means that the piston rod 16 will have to move a greater distance than the piston rod 17 and, therefore the volume of the feedback chamber of the first cylinder 12 will be decreasing at a faster rate than the volume of the feedback chamber of the second cylinder 13 is increasing. With the momentary increase in fluid leaving the feedback chamber of the first cylinder 12, which is more than can be directed into the feedback chamber of the second cylinder 13, fluid fluctuations are caused in the system 10. These fluctuations are regulated by the compensating valve 54. In our example, once the pressure difference across the compensating valve 54 exceeds a maximum predetermined pressure range, the increased pressure in the passage 49 will cause the check ball 75 to open. With the check ball 75 open, fluid can flow through the inlet port 65 and the passage 66 to the outlet port 68. From the outlet port 68 the fluid is directed through the passage 89 and the return line 90 to the reservoir 32. When the operator is satisfied with the leftward turning of the vehicle, he stops turning the steering wheel 52 which in turn stops the actuation of the metering pump 50. With the metering pump 50 stopped, the fluid from the collapsing feedback chamber of the first cylinder 12 will increase the fluid pressure in the passage 48 and this pressure will shift the movable member 40 of the control valve 38 back to its neutral position.

As the operator starts to turn the steering wheel 52 clockwise or to the right, the metering pump 50 is again actuated and a pressure difference is again created between the passages 48 and 49. This time, the higher pressure is in the passage 48 and this higher pressure causes the movable member 40 of the control valve 38 to shift leftward to its second position. In its second position, the control valve 38 allows pressurized fluid from the supply pump 34 to flow through the control valve 38, the passage 43 and the port 45 to the head chamber of the second cylinder 13. Simultaneously, the fluid in the head chamber of the first cylinder 12 is connected by the port 44, the passage 42, the control valve 38 and the return line 90 to the reservoir 32. With continuous movement of the steering wheel 52, the piston rod 16 will retract and the piston rod 17 will extend. The retraction of the piston rod 16 will be faster than the extension of the piston rod 17 until both piston rods 16 and 17 are approximately at the center position in their respective cylinders. Accordingly, an additional volume of fluid is required to maintain the passages 48 and 49 full of fluid. This additional fluid is drawn in through the check valve 57 by the operation of the metering pump 50 in transferring fluid from the passage 49 to the passage 48 while maintaining sufficient pressure in the passage 48 to hold the control valve 38 in its second position.

In rare situations, such as when the steering wheel 52 is being used to break loose a stuck control valve 38, the pressure in the bore 63 of the compensating valve 54 may increase enough during a left turn to close the inner check ball 77 against the valve seat 73. This stops flow through the bore 63 and causes the outer check ball 75 to again block the inlet port 65. When this occurs, the increase in fluid pressure in the passage 49 is limited only by the strength of the operator.

It should be pointed out that both of the outer check balls 74 and 75 could conceivably open at the same time if for some reason an equal pressure value was present at both of the ports 64 and 65, and this equal pressure value exceeded the maximum predetermined pressure range value. The maximum predetermined pressure range value is established by the compressive strength in the compression springs 80 and 81.

It should also be noted that the flat ends 72 and 73 on the shuttle pin 70 aid in allowing the inner check balls 76 and 77, respectively, to close against the valve seats 78 and 79, respectively, when the fluid pressure within the bores 62 and 63 respectively, becomes too great. This feature is important for it permits a sufficient pressure buildup within the system 10 to release the control valve 38 should it become stuck to one side.

Turning the steering wheel 52 further clockwise, past the straight ahead alignment position of the wheels 30 and 31, for a right-hand turn will result in steering the wheels 30 and 31 to the right.

The right-hand turn results in having the movable member 40 of the control valve 38 shifted leftward to the second position. The inside wheel will now be the wheel 31 which will turn through a greater arc than the outside wheel 30. This means that the piston rod 16 will retract a lesser distance than the piston rod 17 will extend. Again, fluid fluctuations and fluid excesses will result which will be corrected by the compensating valve 54 as explained above.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

I claim:

1. A compensating valve comprising:
   (a) a housing having a pair of bores formed therein, each bore having an inlet port and being interconnected by a through passage which communicates with an outlet port;
   (b) a shuttle pin movably positioned in said through passage and extending into each of said bores, said shuttle pin having a cross section which is smaller than the interior cross section of said through passage so as to permit fluid flow therethrough;
   (c) first and second check balls contained in each of said bores for regulating fluid flow therethrough, each of said first check balls being movably positioned against said inlet ports and each of said second check balls abutting opposite ends of said shuttle pin and being movably positioned adjacent to valve seats positioned on opposite ends of said through passage, said first check balls normally being in a closed position blocking fluid flow through said inlet ports and said second check balls normally being spaced from said opposite ends of said valve seats; and
   (d) compression springs positioned between each of said first and second check balls for urging said first check balls to a closed position blocking fluid flow through said inlet ports.

2. The valve of claim 1 wherein said shuttle pin has varying cross-sectional dimensions.

3. The valve of claim 1 wherein said compression springs have approximately equal compressive strength.

4. The valve of claim 1 wherein said shuttle pin has an irregular exterior configuration with first and second ends being larger than a midsection located therebetween.

5. The valve of claim 4 wherein said first and second ends of said shuttle pin have a square cross section which is separated by a midsection having a circular cross section.

6. A compensating valve for regulating fluid pressure between a pair of fluid passages, which comprises:
   (a) a housing having a pair of axially aligned bores formed therein, each bore having an inlet port connected to one of said fluid passages and being interconnected by an axially aligned through passage which communicates with an outlet port;
   (b) a shuttle pin movably positioned in said through passage and extending into each of said bores, said shuttle pin having a cross section which is smaller than the interior cross section of said through passage and having an irregular exterior configuration with first and second ends being larger than a midsection located therebetween;
   (c) first and secoond check balls contained in each of said bores for regulating fluid flow therethrough, each of said first check balls being movably positioned against said inlet ports and each of said second check balls abutting opposite ends of said shuttle pin and being movably positioned adjacent to valve seats positioned on opposite ends of said through passage, each of said first check balls normally being in a closed position blocking fluid flow through said inlet ports and each of said second check balls normally being spaced from said opposite ends of said valve seats; and
   (d) compression springs positioned between each of said first and second check balls for urging said first check balls to their normally closed position and retaining said second check balls against opposite ends of said shuttle pin.

7. The valve of claim 6 wherein said first and second ends of said shuttle pin having a square cross section which is separated by a midsection having a circular cross section.

8. A compensating valve for regulating fluid pressure differences in a pair of fluid passages connected across said valve and joining a pair of chambers exhibiting varying volume, said valve comprising:
   (a) a housing having a pair of axially aligned bores formed therein, each bore having an inlet port connected to one of said fluid passages and being interconnected by an axially aligned through passage which communicates with an outlet port;
   (b) a shuttle pin movably positioned in said through passage and extending into each of said bores, said shuttle pin having a cross section different from the interior cross section of said through passage;
   (c) first and second check balls contained in each of said bores for regulating fluid flow therethrough, each of said first check balls being movably positioned against said inlet ports and each of said second check balls abutting opposite ends of said shuttle pin and being movably positioned adjacent to valve seats positioned on opposite ends of said through passage, said first check balls normally being in a closed position blocking fluid flow through said inlet ports and said second check balls normally being spaced from said opposite ends of said valve seats; and
   (d) compression springs positioned between each of said first and second check balls for urging said first check balls to their normally closed position and retaining said second check balls against opposite ends of said shuttle pin.

* * * * *

UNITED STATES PATENT AND TRADEMARK OFFICE
CERTIFICATE OF CORRECTION

PATENT NO. : 4,463,775

DATED : 7 August 1984

INVENTOR(S) : Richard A. Wittren

It is certified that error appears in the above-identified patent and that said Letters Patent is hereby corrected as shown below:

```
Column 8, line 17, delete "secoond" and insert --
second --; line 35, delete "having" and insert --
have --.
```

Signed and Sealed this

Eighth Day of January 1985

[SEAL]

Attest:

Attesting Officer

GERALD J. MOSSINGHOFF

Commissioner of Patents and Trademarks